United States Patent [19]
Suzuki et al.

[11] 4,113,441
[45] Sep. 12, 1978

[54] STEAM REFORMING REACTOR

[75] Inventors: Akira Suzuki, Tokyo; Kantaro Nakamura, Yokohama; Tetsuo Maejima, Kiyose; Masaru Kajiura, Tokyo; Toshio Aso, Kawasaki; Shoichi Abe, Yokohama; Toshihisa Suzuki, Yokohama; Katsuaki Takemura, Yokohama; Masaya Kuno, Machida; Kazumichi Yoshida, Yokohama; Junji Yokokawa, Yamato; Takeshi Miyasugi, Yokohama; Hiroshi Yagi, Tokyo; Kiyohisa Mukai, Yokohama, all of Japan

[73] Assignee: Director-General Agency of Industrial Science and Technology, Tokyo, Japan

[21] Appl. No.: 775,373

[22] Filed: Mar. 7, 1977

[30] Foreign Application Priority Data

Mar. 9, 1976 [JP] Japan .................... 51-24618

[51] Int. Cl.² .............................. B01J 8/06
[52] U.S. Cl. .................... 422/197; 122/246; 176/37; 176/39; 48/196 A; 422/220
[58] Field of Search ............ 23/289, 288 M; 122/246; 176/37, 39; 48/196

[56] References Cited

U.S. PATENT DOCUMENTS

| | | | |
|---|---|---|---|
| 2,491,618 | 12/1949 | Lugtzelschuab | 23/288 M |
| 2,910,350 | 10/1959 | Jean | 23/289 |
| 3,547,188 | 12/1970 | Kuhnlein | 23/288 M X |
| 3,607,125 | 9/1971 | Kydd | 23/288 M |
| 3,899,420 | 8/1975 | Nozawa et al. | 23/289 X |
| 3,958,951 | 5/1976 | Woekcke et al. | 23/289 X |

*Primary Examiner*—James H. Tayman, Jr.
*Attorney, Agent, or Firm*—Flynn & Frishauf

[57] ABSTRACT

A steam reactor comprises a pressure shell having inlet and outlet nozzles for each of a process gas and a heating gas, a plurality of metal catalyst tubes packed with a catalyst and located substantially vertically within the pressure shell, one and of each of the catalyst tubes being connected to a pipe and the other end being communicated with the inlet nozzle of the process gas; and a riser pipe located substantially vertically within the pressure shell, one end of the riser pipe being connected to the pipes and the other end being terminated in the outlet nozzle of the process gas. A support member is provided on the pressure shell to support the catalyst tubes and the riser pipe. The plurality of pipes which connect the catalyst tubes and the riser pipe have a diameter which is smaller than that of the catalyst tubes and the riser pipe and a structure capable of taking up the difference in thermal expansion between the catalyst tubes and the riser pipe. The pressure shell may be insulated on a part or the whole of the inner surface thereof.

12 Claims, 12 Drawing Figures

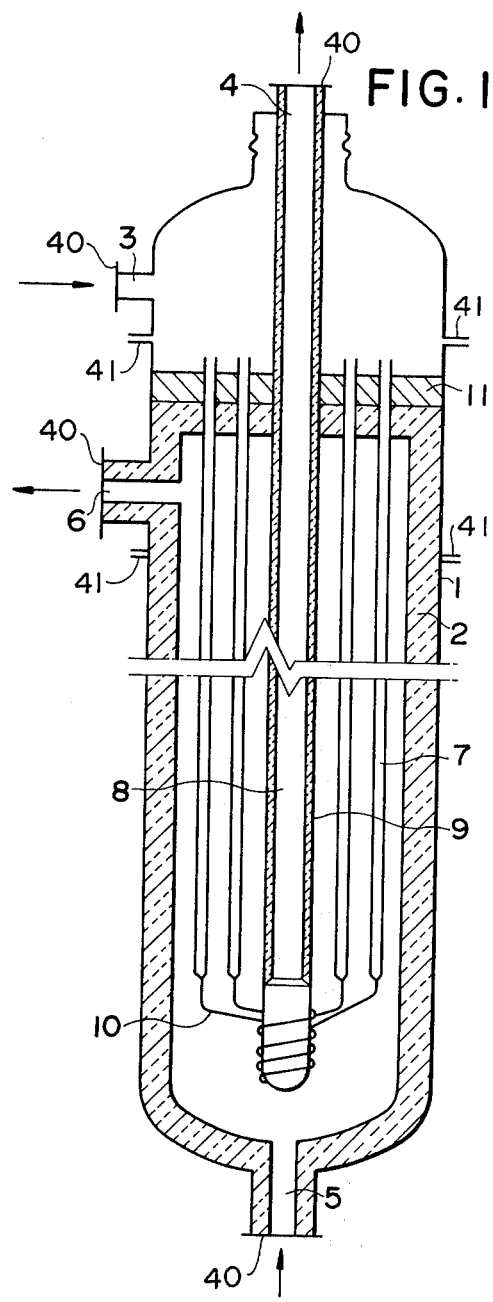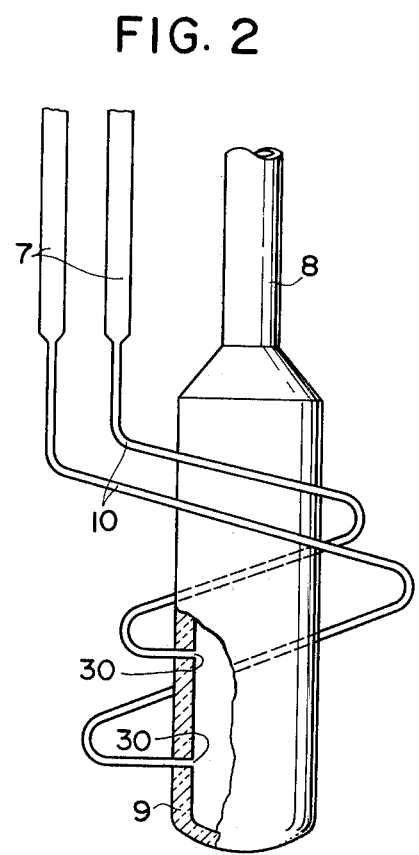

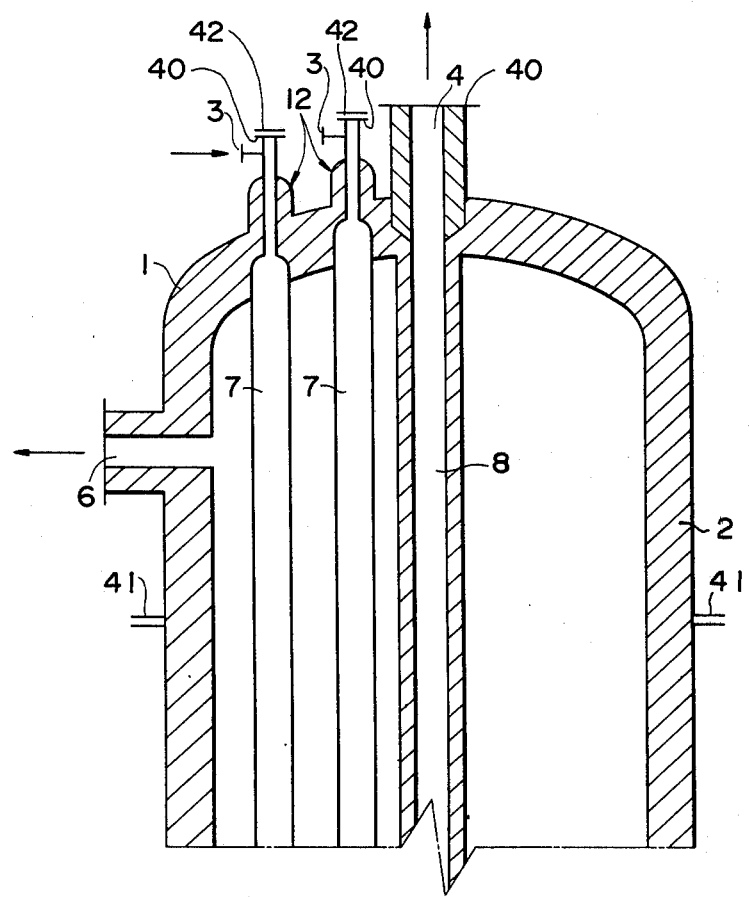

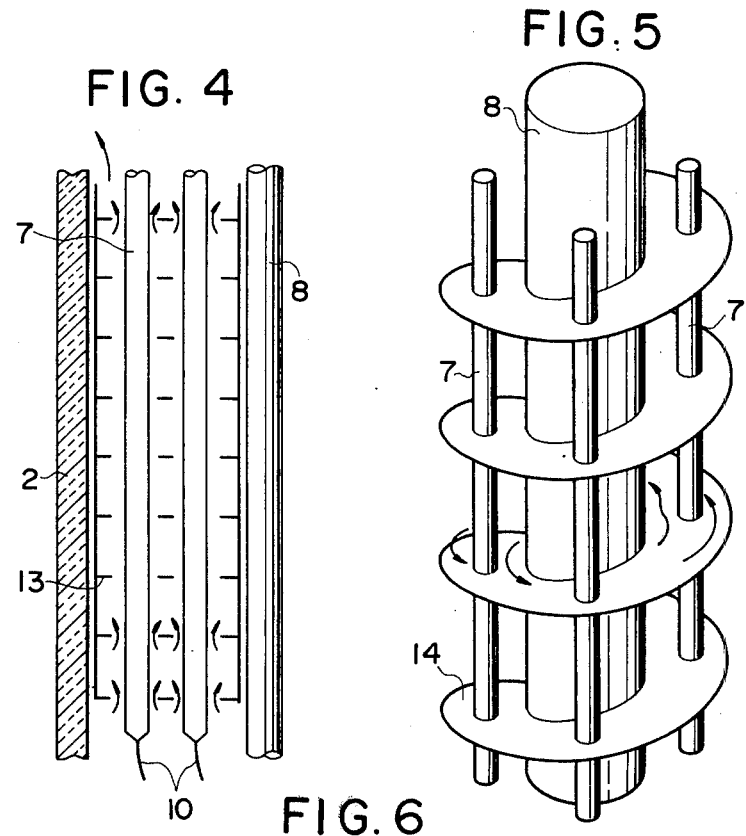
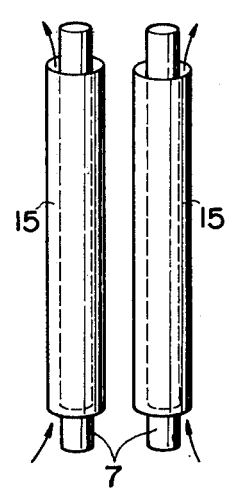

STEAM REFORMING REACTOR

FIELD OF THE INVENTION

The present invention relates to a steam reforming reactor, and more particularly to the reactor for producing hydrogen gas or various kinds of synthetic gases.

BACKGROUND OF THE INVENTION

Heretofore, a box-type furnace the inner wall of which is lined with fire brick has been employed as a steam reforming furnace. Reaction tubes with catalyst have been arranged in the furnace and to these tubes a charge gas is fed and reaction proceeds by heating the gas with a burner attached to the furnace wall.

On the other hand, practical use of plants which utilize nuclear energy as the energy source has been planned in a power generation and in a steelmaking. For realization of the plan, it is very desirable from the viewpoint of thermal efficiency to utilize a high temperature heating medium such as helium gas from a nuclear plant as thermal energy for chemical industries.

From the above viewpoint, we have considered utilizing high temperature helium gas from a nuclear plant as the source of thermal energy for steam reforming which requires high temperatures, and have achieved the present invention by developing a reforming reactor useful for this object. Other high temperature gases can be utilized in the present invention as well as high temperature helium gas from a nuclear reactor and thus, this invention is very profitable.

SUMMARY OF THE INVENTION

The present invention provides a steam reactor comprising a pressure shell having inlet and outlet nozzles for each of process gas and heating gas, and a thermal insulating layer made of thermal insulating material provided on a part or the whole of the inner surface thereof; a plurality of catalyst tubes made of metal, packed with a catalyst and located substantially vertically within the pressure shell, one end of each of the catalyst tubes being connected to a pipe and the other end being communicated with the inlet nozzle of the process gas; and a riser pipe located substantially vertically within the pressure shell and having a thermal insulating layer made of thermal insulating material provided on the outer surface thereof, one end of the riser pipe being connected to the pipes and the other end being terminated in the outlet nozzle of the process gas. The plurality of pipes connecting the catalyst tubes and the riser pipe have a relatively small diameter and have a structure capable of taking up the difference in thermal expansion between the catalyst tubes and the riser pipe. Further provided is a support member provided on the pressure shell to support the catalyst tubes and the riser pipe.

BRIEF DESCRIPTION OF THE DRAWING

FIG. 1 is a sectional side view of one embodiment of the reactor of the present invention;

FIG. 2 illustrates the connections of the catalyst tubes and the riser pipe to the reactor;

FIG. 3 is a sectional side view of the upper portion of another embodiment of the reactor of the present invention;

FIG. 4 shows the structure of an orifice baffle as a device for accelerating heat transfer;

FIG. 5 shows the structure of a helical baffle for accelerating heat transfer;

FIG. 6 shows the use of a sheath for accelerating heat transfer;

EMBODIMENTS OF THE INVENTION

Figure 7:
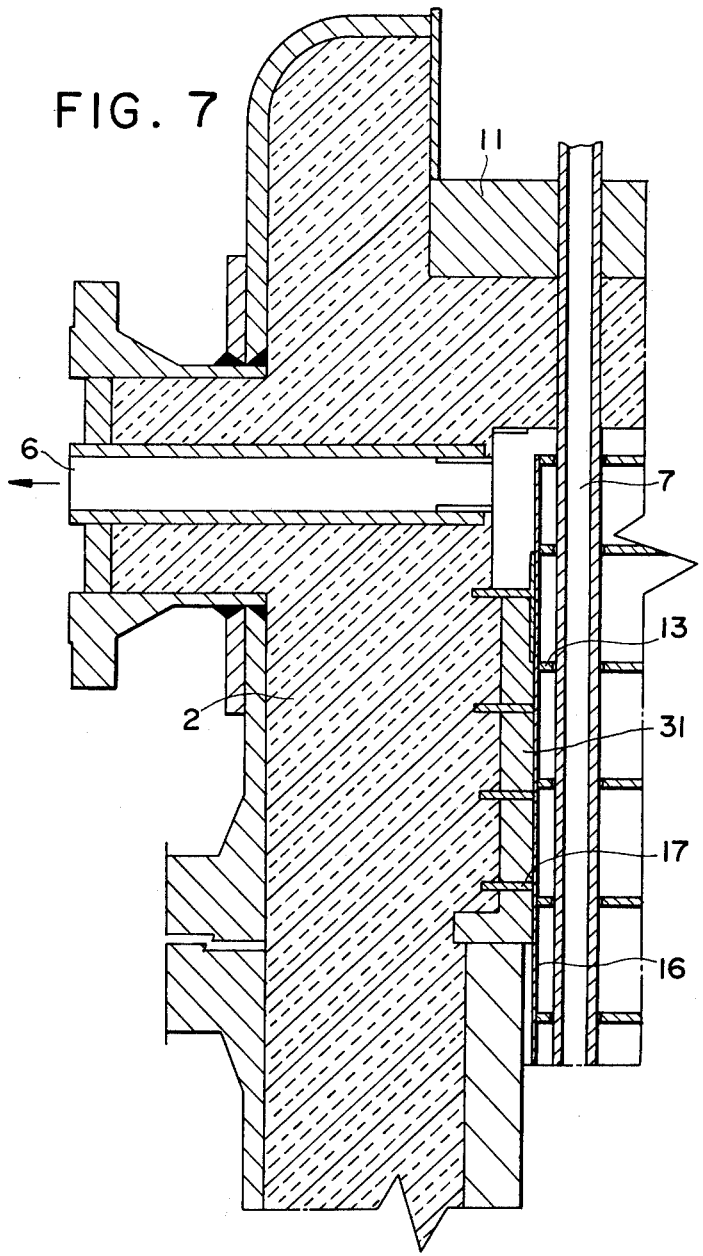
FIGS. 7 and 8 are enlarged views of a part of the reactor including a device for preventing a short circuit of flow of the heating gas.

Production of a reduced gas by steam reforming can be achieved by mixing steam and a light hydrocarbon such as natural gas, naphtha, etc., introducing the resulting mixture to catalyst tubes with catalyst (for example, a nickel-type catalyst), and then heating to effect reaction. The reaction is expressed by the following formulae:

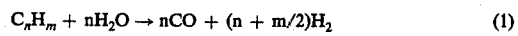
$$C_nH_m + nH_2O \rightarrow nCO + (n + m/2)H_2 \quad (1)$$

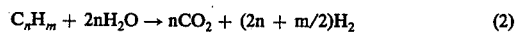
$$C_nH_m + 2nH_2O \rightarrow nCO_2 + (2n + m/2)H_2 \quad (2)$$

$$CO + 3H_2 \rightleftarrows CH_4 + H_2O \quad (3)$$

$$CO + H_2O \rightleftarrows CO_2 + H_2 \quad (4).$$

The present invention utilizes a high temperature heating gas as the source of thermal energy for the above reaction. When high temperature helium gas from a nuclear reactor is utilized, steam reforming is carried out under the conditions of inlet temperature of from 400° to 550° C., outlet temperature of from 600° to about 1,000° C. and a pressure of from atmospheric pressure to 45 kg/cm²G. Helium gas used as a heating gas has a temperature of from 650° to about 1,000° C. at the inlet, and from 500° to 800° C. at the outlet, and a pressure of from 10 to 50 kg/cm²G.

The reactor of the present invention satisfies the above conditions and is such that the above reaction is accomplished without interruption.

Examples of reactors contemplated by the present invention are explained below in connection with the attached Figures.

FIG. 1 is an embodiment of a reactor of this invention. A pressure shell 1 has a thermal insulating layer 2 made of thermal insulating material and defines an inner wall of a heating gas zone which occupies a lower part of the shell 1. The shell 1 is made of metal (such as carbon steel) in order to withstand the inner pressure. As the thermal insulating material, a thermal insulating material for high temperature use such as quartz glass, ceramics fiber, etc., can be utilized, but it should be chosen as an appropriate thermal insulating material depending on the position of the lining. It is preferable to form an efficient insulating layer 2 by combining two or more kinds of the thermal insulating materials.

The shell 1 has an inlet nozzle 3 and an outlet nozzle 4 for process gas, and an inlet nozzle 5 and an outlet nozzle 6 for heating gas (i.e., helium gas). Upper and lower parts of the shell are formed of heat plates and their shapes are arbitrary, for example, semiellipsoidal, semispherical and the like.

Catalyst tubes 7 are made of a metal such as a thermo-resistant alloy and are located substantially vertically within the shell. One end of each tube 7 is connected to a pipe 10 and the other end of each tube 7 is communicated with the inlet nozzle 3 of the process gas. Diameter, length and number of the catalyst tubes 7 should be determined by taking into account the capacity of the reactor, the reaction conditions and efficiency of the reactor, and they are intimately related to each other. It is common that the inner diameter of the tubes 7 is from 50 to 150 millimeters and the length of the tubes is from 6 to 15 meters. Any known steam reforming catalyst such as a nickel-type catalyst can be utilized as the catalyst contained in the tubes 7.

Riser pipe 8 is located centrally of the reactor shell 1 and is used for collecting and releasing a gas produced by the reaction in the catalyst tubes 7. One end of the riser pipe 8 is connected to the pipes 10 and the other end is terminated in the outlet nozzle 4 of the process gas. The inner surface of the riser pipe 8 is covered with a thermal insulating layer 9 made of thermal insulating material and is designed to prevent temperature drop of the produced gas. Materials for the riser pipe 8 are preferably the same as those for the catalyst tubes 7, that is, thermoresistant alloys. Preferable thermal insulating materials for the outer surface 9 are ceramics fiber, etc.

Catalyst tubes 7 and the riser pipe 8 are connected to each other through pipes 10 as shown in FIG. 1. The pipes 10 are designed to absorb the difference in thermal expansion when the catalyst tubes 7 and the riser pipe 8 expand by thermal expansion, and the pipes may take any structure, if their structure is to satisfy the above condition. In general, the pipes 10 originate from (i.e., are connected to) the catalyst tubes 7 and surround the riser pipe 8 in spiral fashion and are connected to the inlet nozzle 30 of the produced gas of the riser pipe 8 as shown in FIG. 2. The pipes 10 are made of a thermoresistant alloy and preferably have an inner diameter of from 10 to 40 millimeters.

Catalyst tubes 7 and the riser pipe 8 are fixed in place by a support member such as plate 11 as shown in FIG. 1. The plate 11 is fixed at the upper part of the inner wall of the shell 1 and the riser pipe 8 extends through the plate 11 and is connected to outlet nozzle 4 for the product gas. Catalyst tubes 7 are also fixed to plate 11 such that their upper ends extend through the plate. By providing the plate 11, the inside of the shell 1 is separated into two zones. Heating gas is introduced to a lower zone (heating gas zone) through inlet nozzle 5 and is released from outlet nozzle 6. On the other hand, process gas is introduced to an upper zone through inlet nozzle 3, is introduced into the catalyst tubes 7 and is then discharged through outlet nozzle 4 after passing through the pipes 10 and the riser pipe 8.

FIG. 3 illustrates the upper portion of another embodiment of a reactor of this invention. In this embodiment the utilization of sleeves 12 as the support member is shown. The sleeves 12 support the catalyst tubes 7 extending through the head plate of the upper part of the shell 1. The riser pipe 8 extends to the head plate of the upper part of shell 1 and is connected thereto for support. Process gas enters catalyst tubes 7 at openings 3, as indicated in FIG. 3.

In order to improve efficiency of the reactor, effective transfer of heat from the heating gas to the catalyst tubes 7 is required. In the present invention, it is preferable to provide an orifice baffle 13 as shown in FIG. 4, a helical baffle 14 as shown in FIG. 5 or a sheath 15 as shown in FIG. 6 in order to accelerate the transfer of heat from the heating gas to a catalyst tube 7. Using these devices to improve heat transfer, heating gas rises up as indicated by arrows in FIGS. 1-6 and more effective transfer of heat can be achieved. In place of a baffle, an appropriate filler such as an alumina ring placed around the catalyst tubes 7 is also effective to accelerate the transfer of the heat. Furthermore, various means such as fins and studs provided on the outer surface of the catalyst tubes 7 and wire for causing a turbulent flow near the catalyst tubes 7 are also effective for the improvement of the transfer of heat. All of the above means can be incorporated into the reactor of the present invention without difficulty.

It is also preferable to provide a mechanism for introducing reaction heat effectively and to insure the proper length flow path of the heating gas. As a means to achieve this, as illustrated in FIG. 7, the outer periphery of the orifice baffle 13 or spiral baffle 14 is covered with a cylindrical member 16. Further, several annular plate assemblies 17 are mounted on the outer periphery of the cylindrical member and are embedded in the thermal insulating layer 2 of the shell 1. By these mechanisms, the flow path of the heating gas is lengthened and a short circuit of flow of the heating gas between the outer periphery of the baffle and the thermal insulating layer 2 of the shell 1 can be prevented. As shown in FIG. 7, it is preferable that the space between the outer periphery of the baffle 13 and the thermal insulating layer 2 is packed with a thermal insulating material 31.

Figure 8:
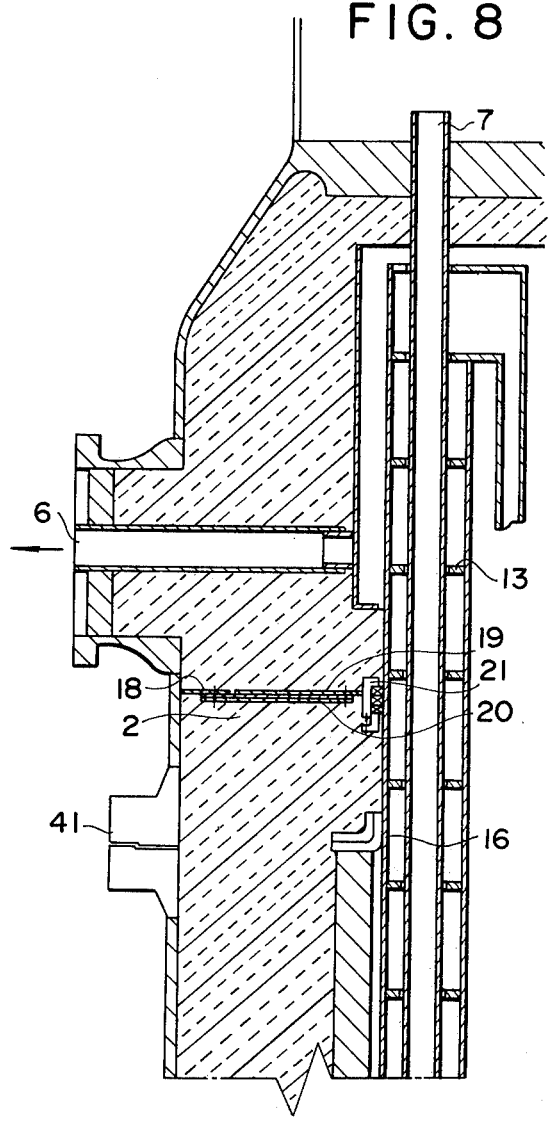
Figure 9:
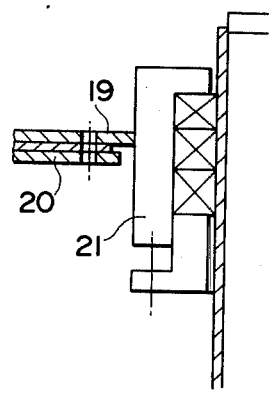
FIGS. 9 and 10 are enlarged sectional views of parts of the device shown in FIGS. 7 and 8, FIG. 10 also showing a further modification.

Another embodiment is illustrated in FIG. 8, where providing the sealing mechanism in which three metal annular plate assemblies 18, 19, 20 are embedded horizontally in the thermal insulating layer 2 of the shell and the outermost plate 18 is secured to the shell 1. A stuffing box or sealing member 21 is set inside the innermost annular plate 19. Further, a filler is packed between the stuffing box or the sealing member 21 and the above described surroundings of the cylindrical member 16. Member 21 also helps prevent a short flow path of the heating gas from developing. FIG. 9 is an enlarged sectional view of the sealing part.

Figure 10:
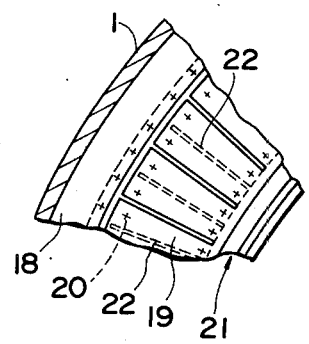

Another embodiment is shown in FIG. 10, where the main portion is the same as those shown in FIG. 8 and 9, but a plurality of slits 22 are provided radially in each annular plate. As a result, the thermal expansion is absorbed. Further, by use of the above-described sealing parts, a short circuit of flow of the heating gas inside the thermal insulating layer 2 can be effectively prevented.

Figure 11:
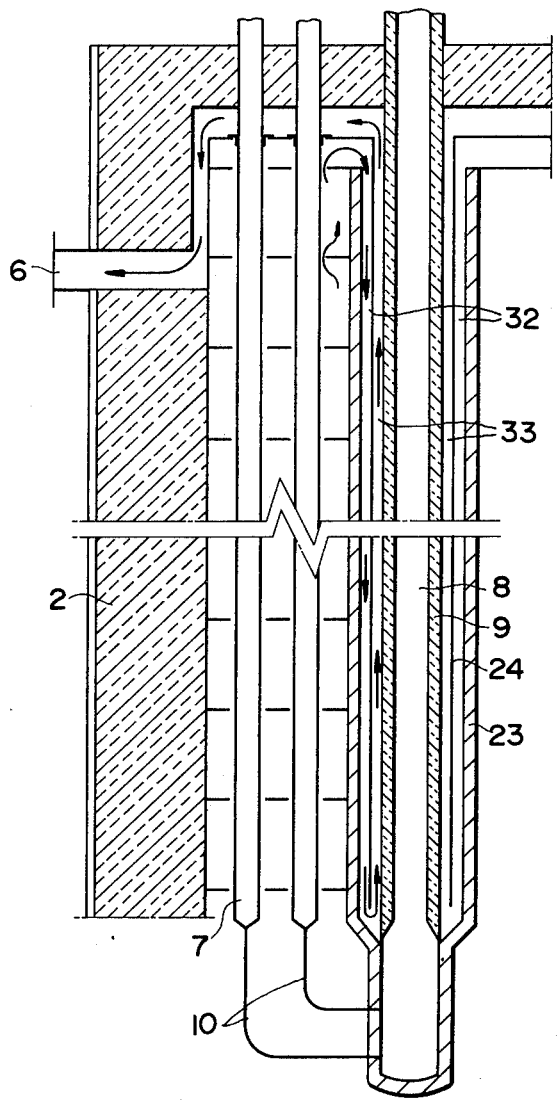
FIG. 11 is a sectional side view of a part of the reactor including a device for decreasing the thermal stress.

Since the catalyst tubes and the riser pipe are secured to the plate 11 (FIG. 1) or the head plate of the reactor (FIG. 3), the difference in the thermal expansion between the catalyst tubes and riser pipe during operation is absorbed by the pipes 10 connecting them at the lower parts thereof. However, in order to decrease thermal stress produced by the difference in the thermal expansion as much as possible by cooling or heating the riser pipe, it is preferable if heating gas rising up after finishing the supply of the reaction heat is utilized. FIG. 11 shows such an embodiment.

As shown in FIG. 11, two annular pipes are disposed coaxially to the riser pipe 8, that is, an outer pipe 23 of thermal insulating material and an inner pipe 24 provided between the outer pipe 23 and the riser pipe 8 are installed to provide two circular or annular cross section gas flow paths 32, 33 for gas. The upper end of the outer flow path 32 is connected to the flow path of the heating gas rising up after finishing the supply of reaction heat to the catalyst tubes 7, and the upper end of the inner flow path 33 is connected to the outlet nozzle 6 of the heating gas. The bottom of the outer pipe 23 is secured to the lower portion of the riser pipe 8 to connect the inner and outer flow paths 32, 33 to each other. Thus, heating gas rising up after finishing the supply of reaction heat to the catalyst tubes 7 is guided to go down the outer flow path 32 along the direction of the arrow, the gas then has its direction changed to rise up again along the inner flow path 33, and after rising to the uppermost part of the shell 1 after cooling or heating the riser pipe 8, the gas is released to the outside of the shell via nozzle 6.

Figure 12:
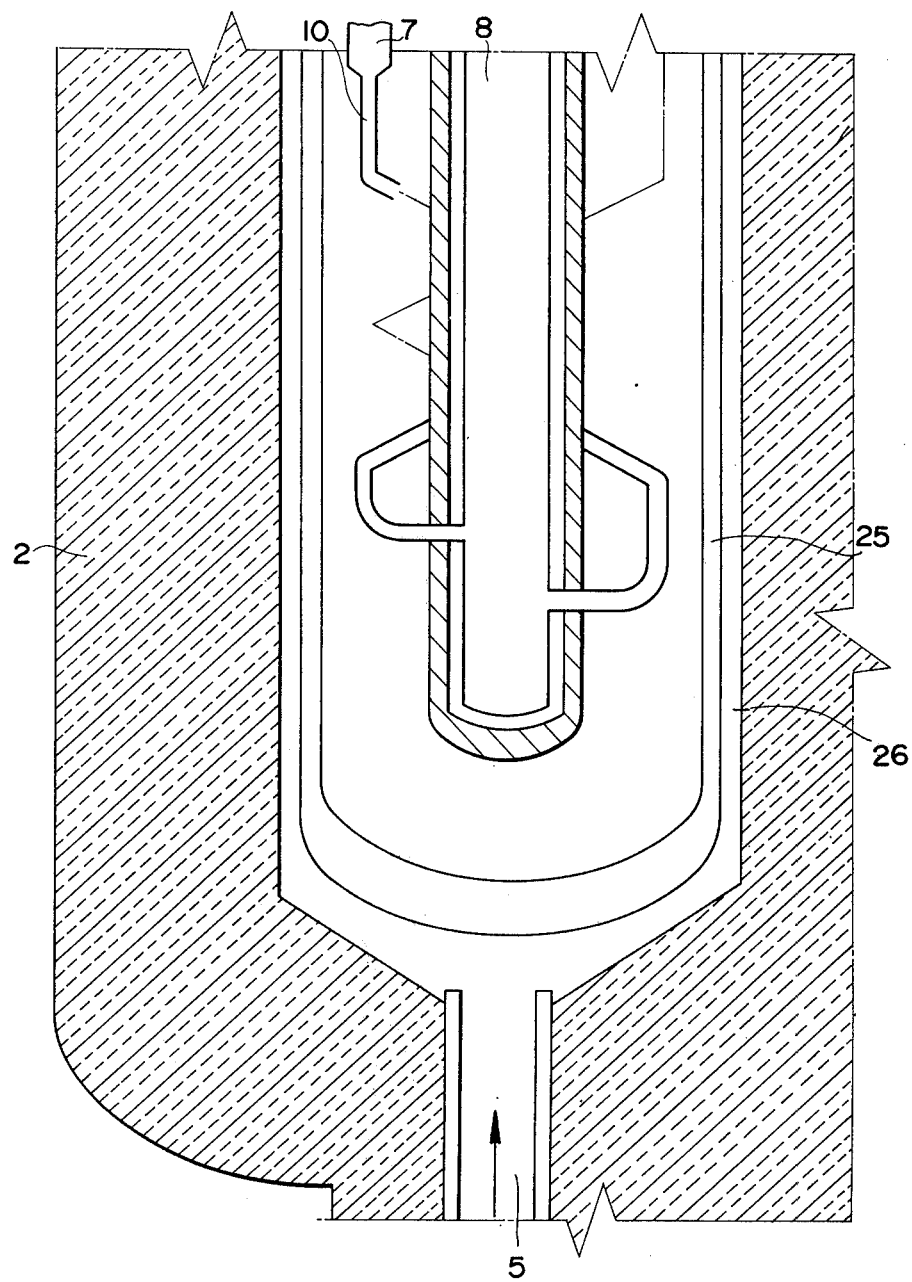
FIG. 12 is a sectional side view of a part of the reactor including a shield member.

As described above, it is not preferable to have the heating gas directly contact the pipes 10 or the bottom of the riser pipe 8, since the heating gas is at a high temperature of from about 650° to about 1,000° C. and rises with a relatively high speed around the inlet nozzle 5. That is, when the heating gas directly contacts the pipes 10 and the pipe 8, the temperature increases excessively and causes them to vibrate. Thus, it is desirable to provide a shield member 25, as shown in FIG. 12, with its bottom having a generally U-shaped vertical cross section, in order to separate the inlet nozzle of the heating gas 5 and the pipes 10 and the riser pipe 8. The shield member 25 is made of a thermal insulating material such as fire brick. The heating gas is thus led through the space 26 between the shield member 25 and the inner surface of the shell 1, and the heating gas reaches the catalyst tubes 7 by rising up through said space 26.

The thermal insulating layer 2 of the inner surface of the shell 1 is constructed with the above described materials and when materials with highly gas permeable materials such as inorganic fibrous materials, etc., are used, passing of the heating gas through the spaces of these fibers in the thermal insulating layer is observed. Even when very dense materials are used, passing of the heating gas through such portions as a joint cannot be neglected.

Therefore, it is preferable to install one or more layers of a substance selected from the group consisting of metal foil, metal plate, dense ceramic plates and plates fabricated from inorganic fibers so as to provide gas-tightness, the layers being disposed with substantial angle, preferably substantially at a right angle to the flow of the heating gas in the inner portion of the thermal insulating layer on the pressure shell to effectively prevent leakage of the heating gas into the inner portion of the thermal insulating layer and a resulting short flow path of the heating gas in the inner portion of the thermal insulating layer on the shell.

The reactor of the present invention need not include a burner of the conventional apparatus, since the reactor is designed to utilize high temperature gas such as high temperature helium gas, etc., from a nuclear energy plant as the heating gas. Further, the reactor is designed to be pressure proof and thus, it can utilize not only high temperature helium gas from a nuclear reactor but also various kinds of pressurized high temperature gas as the heating gas.

Furthermore, the reactor of the present invention is of the convection heat transfer type and thus, the reactor can be miniaturized remarkably in comparison with the conventional steam reforming reactor of radiant heat transfer type which utilizes petrochemical materials as fuel. From the viewpoint of economy, by employing the present invention various thermal energy sources including a nuclear reactor can be utilized in order to produce effectively a large amount of a reduced gas which is required for steelmaking, etc., and to supply it to a plant for reducing iron ores at high temperature. On the other hand, the heating gas can be recycled for reuse; for example, helium gas can be sent back to the nuclear reactor for recycling of the gas, thereby improving the efficiency of the process of producing energy.

As shown in the Figures, flange 40, shell flange 41 and blind flange 42 are used in the reactor of this invention.

What is claimed is:

1. A steam reforming reactor comprising:
    a pressure shell having inlet and outlet nozzles for each of process gas and heating gas, and a thermal insulating layer made of thermal insulating material provided on at least a part of the inner surface of the pressure shell;
    a plurality of catalyst tubes, each having two ends and being made of metal, the catalyst tubes being packed with a catalyst and located substantially vertically within the pressure shell, one end of each catalyst tube being communicated with the inlet nozzle of the process gas;
    a riser pipe having two ends and being located substantially vertically within the pressure shell, the riser pipe having a thermal insulating layer made of thermal insulating material on the outer surface thereof, one end of the riser pipe being terminated in the outlet nozzle of the process gas;
    a plurality of pipes connecting the other ends of the catalyst tubes to the other end of the riser pipe, said plurality of pipes having a smaller diameter than the catalyst tubes and riser pipe and taking up the difference in thermal expansion between the catalyst tubes and the riser pipe;
    a baffle provided around the catalyst tubes to accelerate the transfer of heat from the heating gas to the catalyst tubes;
    a cylindrical member around the outer periphery of the baffle to prevent a short flow path of the heating gas;
    an annular plate assembly mounted on the cylindrical member and embedded in the thermal insulating layer on the pressure shell, the annular plate assembly comprising at least two annular plates disposed coaxially and overlapping partly on each other, one plate being outermost relative to the other, the outermost plate being secured in the pressure shell and the innermost plate being provided with a ground type seal mechanism having peripheral stuffing box within its inner periphery to take up the difference in thermal expansion between the cylindrical member and the pressure shell by sliding with the cylindrical member and to prevent a short flow path of the heating gas; and
    a support member provided on the pressure shell to support the catalyst tubes and the riser pipe.

2. A steam reforming reactor according to claim 1, wherein the support member comprises a plate coupled to the tubes and the pipe, and secured within the pressure shell to withstand the pressure of each of the heating gas and the process gas, and to separate them from each other.

3. A steam reforming reactor according to claim 1, wherein the support member comprises a head plate of the shell; and at least the catalyst tubes each extend through the head plate and are connected to the head plate to withstand the pressure of the heating gas in the shell, to prevent heat transfer away from the catalyst tubes and the riser pipe.

4. A catalytic reforming reactor according to claim 3, comprising sleeves connecting the catalyst tubes and riser pipe to the head plate to release the heat stress at the portions where the catalyst tubes extend through the head plate.

5. A steam reforming reactor according to claim 1, wherein the baffle is an orifice baffle providing gas flow orifices.

6. A steam reforming reactor according to claim 1, wherein the baffle comprises a helical baffle for producing a helical gas flow path around the catalyst tubes.

7. A steam reforming reactor according to claim 1, comprising a filler around the catalyst tubes to accelerate the transfer of heat from the heating gas to the catalyst tubes.

8. A steam reforming reactor according to claim 1, comprising a shield member mounted between the inlet nozzle of the heating gas, and the pipes and the bottom of the riser pipe, to define a passage for the heating gas maintaining the heating gas out of direct contact with the pipes and the bottom of the riser pipe.

9. A steam reforming reactor according to claim 1, comprising a layer in the pressure shell for preventing leakage of the heating gas, the layer comprising one or more substances selected from the group consisting of a plurality of metal foil, metal plate, dense ceramics plate and plate fabricated from inorganic fiber so as to provide gastightness, the layer being disposed substantially at a right angle to the flow of the heating gas and being provided in the inner portion of the thermal insulating layer on the pressure shell to prevent leakage or passage of the heating gas into the inner portion of the thermal insulating layer on the pressure shell.

10. A steam reforming reactor according to claim 1, comprising an insulating layer on substantially the whole inner surface of th pressure vessel.

11. A steam reforming reactor according to claim 1, wherein a plurality of slits is provided radially in each of the annular plates and the annular plates are overlaid on each other such that the slits cross with each other to thereby prevent the formation a strain by thermal expansion of the annular plates owing to the radical distribution of temperature and to prevent a short flow path of the heating gas.

12. A steam reforming reactor according to claim 1, wherein heating gas is heating gas comprising helium gas having a temperature up to about 1000° C.

* * * * *